3,494,201
PIPETTING SYSTEM
William J. Roach, Hayward, Calif., assignor to Oxford Laboratories, San Mateo, Calif., a corporation of California
Filed Aug. 16, 1968, Ser. No. 753,268
Int. Cl. G01n 1/14
U.S. Cl. 73—425.6                5 Claims

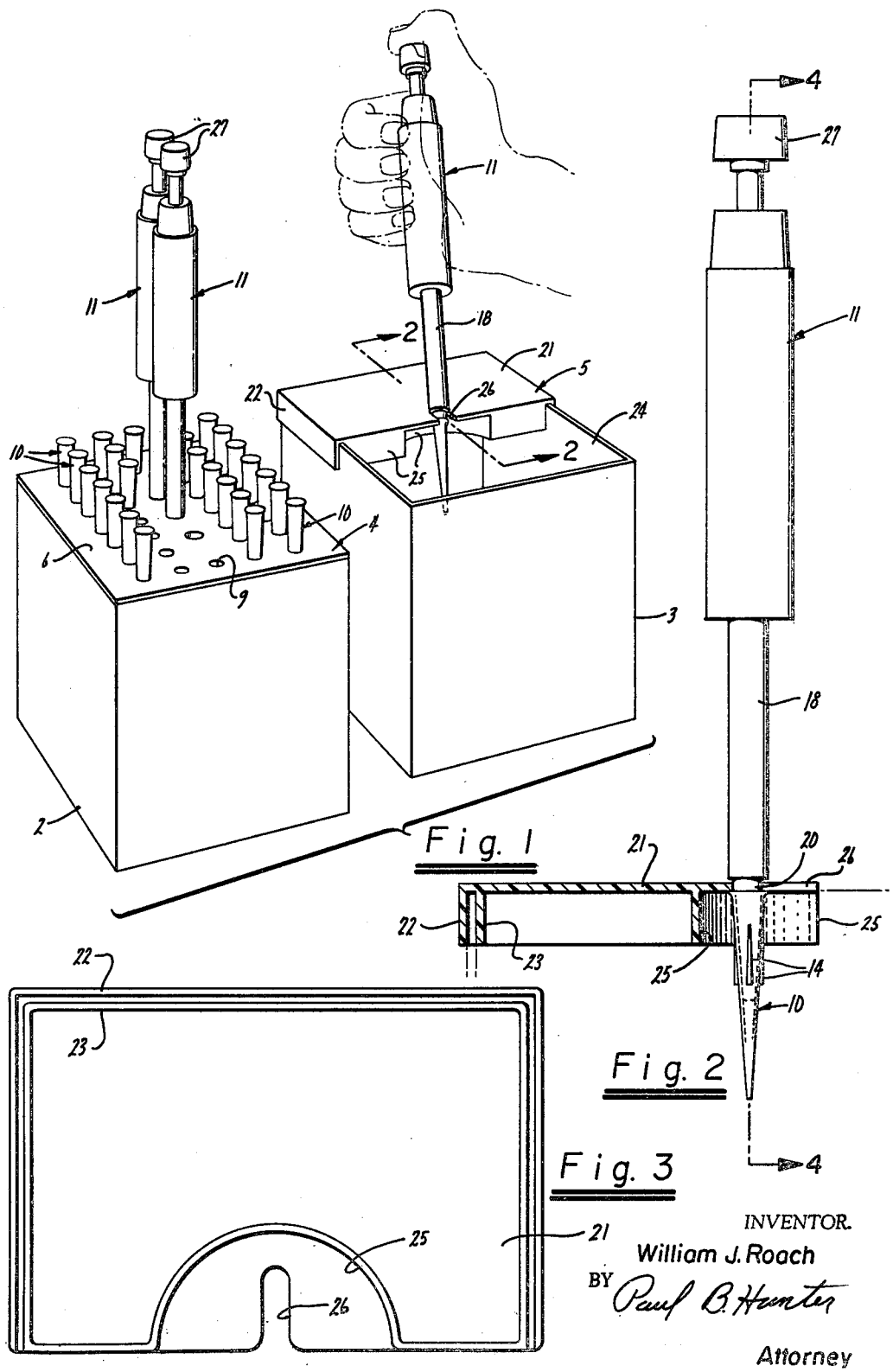

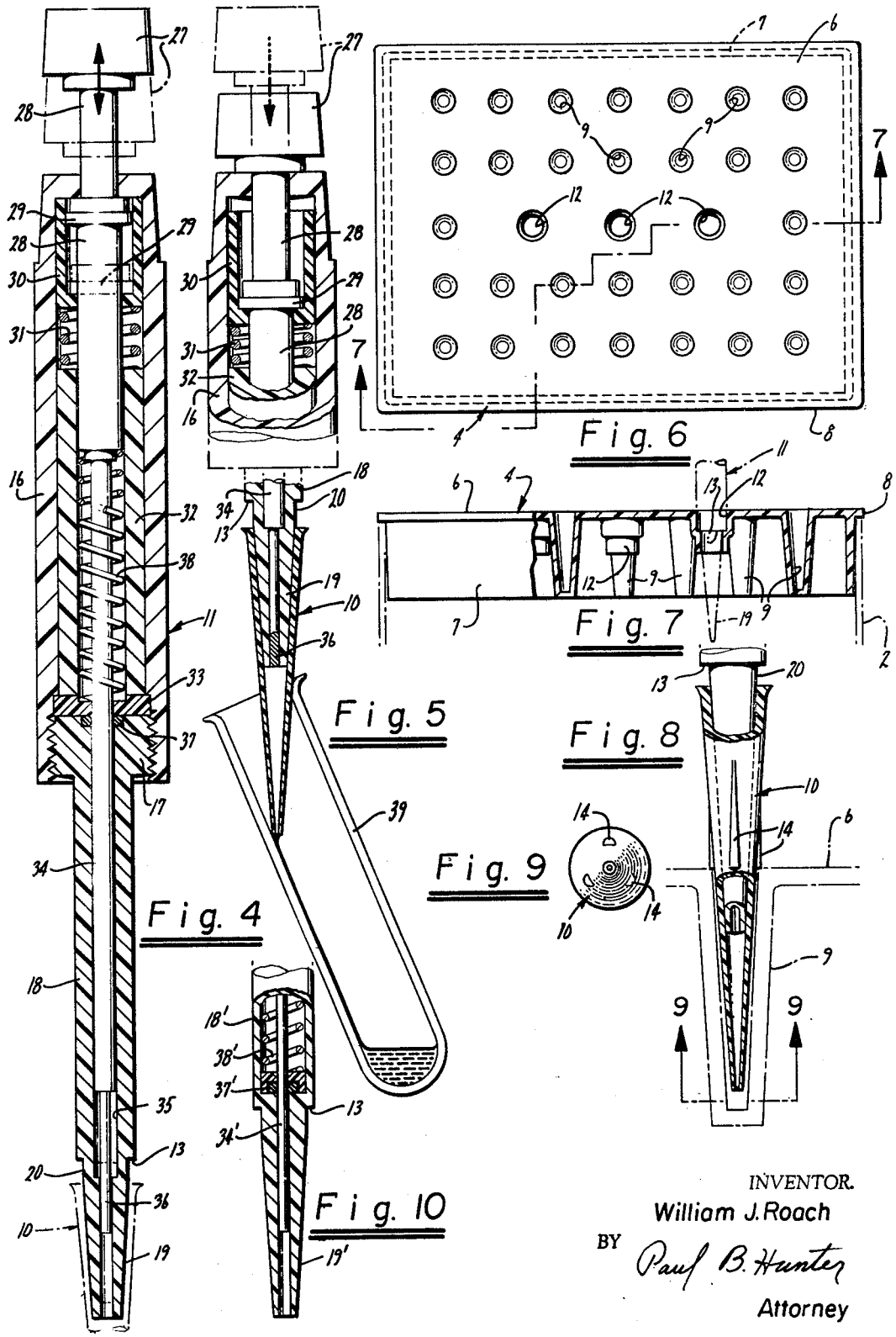

ABSTRACT OF THE DISCLOSURE

A hollow cylindrical body has an apertured lower end portion for frictionally attaching removable tips. A movable piston, within the body, extends into the lower end portion. A collar is fixed to the upper portion of the piston and moves within a calibrating cup. The calibrating cup also moves within the body. Depressing a knob attached to the upper end of the piston will overcome the tension in a primary spring, which is interposed between a portion of the piston and the body, until the calibrating collar strikes the bottom of the calibrating cup constituting the calibration movement of the piston. An over-shoot of travel by the piston may be accomplished by further depressing the knob against the action of a relatively stiff secondary spring interposed between the bottom of the cup and the body.

---

This invention relates generally to pipetting systems, and the invention has reference more particularly to a novel micropipetting system that is adapted to dispense liquids such as plasma or reagents with an exceedingly high degree of accuracy and reproducibility.

Pipetters as heretofore used for dispensing liquids have been generally objectionable for various reasons such as lack of accuracy in reproducibly dispensing desired definite quantities of liquids, lack of cleanliness due to manual handling of the dispensing tips used or other causes such as cross-contamination, or because the pipetters used have been complicated in structure and expensive to purchase and difficult to use.

The principal object of the present invention is to provide a novel pipetting system that is suitable for accurately dispensing liquids in the range of five to one thousand lambdas (microliters) and which is so constructed and arranged as to eliminate cross-contamination or other contamination of the samples dispensed.

A feature of the present invention is to provide a novel pipetting system of the above character employing a precision micro pipetter in conjunction with a combined instrument rack and tip loading tray together with a tip extractor, the system being so constructed and arranged that there is no manual touching of the tips used.

Another feature of the present invention is to provide a novel pipetting system of the above character employing precision molded, non-wettable, disposable plastic tips.

Other features and advantages of the present invention will become more apparent after a perusal of the following specification taken in connection with the accompanying drawings wherein:

FIG. 1 is a perspective view of the novel pipetting system of this invention, showing the manner of using the instrument rack and tip loading tray together with the tip extractor;

FIG. 2 is an enlarged fragmentary view taken along the line 2—2 of FIG. 1;

FIG. 3 is an enlarged view looking at the underside of the tip extractor;

FIG. 4 is an enlarged part sectional view taken along the line 4—4 of FIG. 2;

FIG. 5 is a fragmentary view showing the pipetter in use;

FIG. 6 is a plan view of the instrument rack and tip loading tray;

FIG. 7 is a sectional view taken along the line 7—7 of FIG. 6;

FIG. 8 is an enlarged fragmentary view showing the manner of removing a tip from its loading tray;

FIG. 9 is a view taken along the line 9—9 of FIG. 8; and

FIG. 10 is a fragmentary view of a slightly modified structure of pipetter.

Similar characters of reference are used in the above figures to designate corresponding parts.

Referring now to FIGS. 1 through 9 of the drawings, FIG. 1 illustrates the novel micropipetting system as a whole, shown comprising two boxes 2 and 3, the box 2 supporting a pipetter or instrument rack and tip loading tray 4 while the box 3 supports a tip extractor 5. The instrument rack and tip loading tray 4, as shown in detail in FIGS. 6 and 7, consists of a preferably plastic base 6 of generally rectangular shape having a depending peripheral flange 7 together with a protruding peripheral lip 8 for enabling the rack and tip loading tray to be inserted into the upper portion of box 2 and retained upon the top edge of this box. This rack and tip loading tray is formed with a plurality of depending tip receiving receptacles 9 that are mutually spaced for receiving and supporting tapered tips 10 which latter are precision molded, chemically resistant and non-wettable as well as disposable after a single use. The tips 10 are shown formed with ribs 14, the lower shoulder ends of which abut the top of base 6 to support the tips thereon. It will be noted that the tips 10 are internally tapered and conformably receive the tapered lower ends of the novel pipetters 11 of this invention. In shipping the pipetting system, the tips 10 are normally contained in plastic bags which are found within the boxes 2 and 3. In use, the number of tips intended to be used during any one day are usually removed from the plastic bags and inserted into the receptacles 9 in the loading tray 4, the plastic bags in the meantime having been preferably stored away in a suitable place such as a cabinet.

The pipetters 11 used in conjunction with the tips 10 are adapted to be mounted in depending open-ended mutually spaced socket members 12 provided in the central portion of the plastic base 6 of the instrument rack and tip loading tray 4, these socket members 12 each being provided with an annular step for supporting the pipetters 11, as especially shown in FIG. 7, the pipetters having an annular shoulder 13 for resting on the socket member steps when not in use.

The pipetters 11 comprise a main hollow cylindrical body 16 that is open at its lower end and into which is threaded the upper enlarged end portion 17 of a depending hollow stem or lower tubular body 18 of reduced diameter, said body 18 having a tapered frusto-conical lower end portion 19 below the shoulder 13 for conformably and snugly fitting onto the tips 10. It will be noted that with the end portion 19 inserted into a tip 10, an annular space 20 is provided between shoulder 13 and the top of the tip 10 so as to enable ready removal of the tip by use of tip extractor 5 as will further appear.

Tip extractor 5 comprises a flat, rectangular top portion 21 provided with a depending peripheral flange 22 extending around three of its sides for abutting the outer upper edge portions of three sides of box 3, the fourth side of top portion 21 being spaced from the fourth side of box 3 when mounted thereon so as to leave an open space 24. Tip extractor 5 also has an inner flange 23 slightly spaced from flange 22 for receiving the upper edges of the box 3 therebetween, said inner flange extending also along the fourth side of top portion 21 adjacent opening 24 and being inwardly curved at 25 surrounding a transverse slot 26 provided in the top portion 21, slot 26 being of sufficient width to accommodate the tapered portion 19 of stem 18 just below shoulder 13 and above tip 10 when a tip is attached to the tapered portion 19. Thus, the space 20 will permit the insertion of tapered end portion 19 when it is desired to remove a tip, such removal being accomplished by tilting pipetter 11 slightly as illustrated in FIG. 1, thus removing the tip 10 without manually touching the same, to prevent contamination.

The pipetter 11 comprises an upper exterior plunger knob 27 that is attached to the upper end of a plunger piston 28 that extends through the upper end of the body 16 and downwardly within the hollow interior thereof and has a calibrating collar 29 fixed thereon that is slidable vertically within a calibrating cup 30 which in turn is slidable within the interior body 16. A secondary relatively stiff coil compression spring 31 abuts at its upper end against the bottom of calibrating cup 30, thus urging the upper edge of this cup into abutting relation to the inner surface of the top of body 16, while the lower end of this spring abuts the top of a spring retainer sleeve 32 that extends downwardly within body 16 and abuts an O-ring retainer disc 33 which in turn abuts the top of stem 18.

The plunger piston 28 has a reduced lower portion or piston 34 that extends downwardly within body 16, through disc 33, and within stem 18. The hollow interior of stem 18 is of such diameter as to permit a sliding fit for the piston 34, and, with the knob 27 and calibrating collar 29 in their uppermost positions as shown in FIG. 4, there remains a space 35 within stem 18 to allow downward movement of this piston. Piston 34 is shown provided with a reduced extension 36 which extends downwardly into the tapered portion 19 of stem 18, the central aperture within this tapered portion accommodating extension 36 with a sliding fit. The upper surface of enlarged end portion 17 of stem 18 is centrally recessed to accommodate an O-ring 37 which surrounds the piston 34 in sealing relation, this O-ring 37 being retained in place by the retainer disc 33. A primary compression spring 38 surrounds piston 34 within body 16 and abuts at one end against the main body of plunger piston 28 and at its other end against a suitable recess provided in O-ring retainer disc 33. This spring is of considerably less strength than the secondary spring 31.

In operation, the user will grasp the pipetter as illustrated in FIG. 1, with the body 16 held in the hand so that the plunger knob 27 can be operated by the thumb. As this knob is depressed against the tension of primary spring 38, a stop will be encountered, i.e., the engagement of calibrating collar 29 with the bottom of calibrating cup 30, the knob 27 then being in the dot-dash position shown in FIG. 4. This travel from the released position to the stop is the primary or calibrating movement and compresses primary spring 38 somewhat. Now, with additional pressure, the plunger knob may be depressed to its lowest position, i.e., when the under-surface of this knob directly engages the top of body 16 as illustrated in FIG. 5. This travel beyond the calibrating range is the secondary or over-shoot movement.

To pick up and deliver a precise quantity of liquid, the user will first remove the pipetter from its socket member 12 in instrument rack and tip loading tray 4. He will then guide the tapered portion 19 of stem 18 into the bore of a tip 10, pressing firmly down and vertically withdrawing. This will remove the tip 10 as friction will retain the tip on the pipetter. The knob 27 is now depressed to the first stop, i.e., performing the primary or calibrated movement, as evidenced by collar 29 striking the bottom of cup 30 before the tip is introduced into the sample solution. The tip is now introduced into the sample solution approximately one-eighth of an inch deep, and the plunger knob 27 is allowed to return smoothly to its initial position, whereupon the pipetter can be removed from the sample solution and the tip wiped, if desired, with a lint-free material without touching the tip opening. The tip is now introduced into a receiving vessel such as test-tube 39, placing the tip against the side-wall thereof. The plunger knob 27 is now smoothly depressed to the first stop, and, after a pause, depressed to the second and lowest position against the tension of secondary stiff spring 31, as illustrated in FIG. 5. With the knob held in the lowest position, the pipetter instrument is slowly withdrawn with the tip 10 sliding against the inner wall of the test-tube 39 to remove all traces of liquid, whereupon the pipetter is introduced into the notch 26 of tip extractor 5, as shown in FIG. 1, to remove the tip 10.

The movement of the knob 27 to the first stop causes the piston 34 to move from the solid line position shown in FIG. 4 to the dotted line position shown therein, and this is the length of movement that takes place during loading of the pipetter. The movement from the dotted line position to the bottom of space 35 represents the over-travel of the piston during the movement of the plunger 27 to the second or lowest position of the piston 34, thus causing reduced extension 36 of this piston to over-travel from its dotted position shown in FIG. 4 to its lowest dotted position shown in full lines in FIG. 5, with the lowest end of this reduced extension of the piston substantially flush with the lower end of tapered portion 19. This over-travel of the piston, i.e., beyond the calibrated range, serves to eliminate substantially all traces of liquid in the tip 10. By varying the thickness of calibrating collar 29 and/or the size of cup 30 and diameter of piston extension 36, the capacity of the pipetter may be varied. If desired, the plunger piston 34 may be made of uniform diameter throughout its length as shown at 34' in FIG. 10. In this figure, the primary spring 38' is shown extending within the tubular body 18', and the O-ring is positioned adjacent the tapered portion 19'.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a pipetting system, a pipetter comprising a hollow cylindrical body having a substantially flat top portion and a frusto-conical apertured lower end portion, a hollow frusto-conical tip shaped for conformably and frictionally engaging said frusto-conical body lower end portion to retain said tip on said body portion, a piston movable within said body and projecting into said frusto-conical lower end portion, the upper end portion of said piston projecting upwardly through the top portion of said body, a knob attached to the upper end of said piston exteriorly of said body, a relatively weak primary compression spring surrounding said piston and interposed between a portion of the same and said body to urge said piston upwardly within said body, a calibrating cup within said body adjacent the top portion thereof, a calibrating collar fixed on said piston and normally abutting the inner surface of said body top portion and movable within said cup, and a secondary relatively stiff compression spring interposed between the bottom of said cup and said body, the depressing of said knob by overcoming the lower tension of said primary spring until said calibrating collar strikes the bottom of said calibrating cup constituting the calibrated movement of said piston, further depressing said knob against the increased tension of said relatively stiff secondary spring until said knob abuts the top portion of said body constituting the over-shoot travel of said piston.

2. In a pipetting system as defined in claim 1, an O-ring surrounding and sealing said piston within said cylindrical pipetter body, an O-ring retainer engaging said O-ring on one side and said primary spring on the other, and a retaining sleeve within said pipetter body and abutting said O-ring retainer at one end in surrounding and guiding relation to said primary spring and abutting said secondary spring at its other end.

3. In a pipetting system as defined in claim 1 wherein said pipetter removable tips are provided with rib projections having stop shoulders, an instrument rack and tip loading tray having a flat top provided with a plurality of mutually spaced depending receptacles for receiving said tips, said rib projections stop shoulders supporting said tips on the top of said rack and tip loading tray, said tray having a depending flange for fitting upon the top of a box, said rack and tip loading tray having depending socket members for supporting said pipetters thereon when not in use.

4. In a pipetting system as defined in claim 1 wherein said pipetter body is provided with a reduced lower stem portion terminating in said frusto-conical lower end portion for enabling said body to enter narrow vessels and is further formed with a projecting shoulder adjoining said frusto-conical lower end portion, said shoulder acting as a fulcrum point in removing tips from said body in use.

5. In a pipetting system as defined in claim 4, a tip extractor having a flat top provided with a peripheral depending flange for fitting upon a supporting box, said top having a transverse slot for receiving the frusto-conical lower end portion of said pipetter above a tip held thereon, the tilting of said pipetter when entered into the slot serving to cause said projecting shoulder in conjunction with said tip extractor to eject the tip from said pipetter and into the box without manually touching the tip.

References Cited

UNITED STATES PATENTS

| | | | |
|---|---|---|---|
| 2,530,909 | 11/1950 | Riggs | 73—425.6 |
| 2,959,964 | 11/1960 | Streitfeld | 73—425.6 |
| 3,244,009 | 4/1966 | Tietje et al. | 73—425.6 |
| 3,302,462 | 2/1967 | Pursell. | |
| 3,343,539 | 9/1967 | Moorhouse | 222—340 XR |

LOUIS R. PRINCE, Primary Examiner

H. C. POST III, Assistant Examiner

U.S. Cl. X.R.

23—292; 128—218